United States Patent [19]
Kellstrom

[11] 4,065,191
[45] Dec. 27, 1977

[54] ROLLER SKEW CONTROL FOR TAPERED ROLLER BEARINGS

[75] Inventor: Erik Magnus Kellstrom, Partille, Sweden

[73] Assignee: SKF Industries, Inc., King of Prussia, Pa.

[21] Appl. No.: 686,030

[22] Filed: May 13, 1976

[51] Int. Cl.² .................. F16C 19/00; F16C 33/00
[52] U.S. Cl. .......................... 308/202; 308/207 R; 308/214
[58] Field of Search ............... 308/202, 207 R, 214, 308/215, 216, 217

[56] References Cited
U.S. PATENT DOCUMENTS

3,990,753  11/1976  Kellstrom ..................... 308/202

*Primary Examiner*—Richard A. Bertsch
*Attorney, Agent, or Firm*—Eugene E. Renz, Jr.

[57] ABSTRACT

A tapered roller bearing comprising inner and outer members and a plurality of frusto-conical rolling elements interposed between the members has means for controlling the skew angle of the rolling elements during operation of the bearing to lower overall friction in the bearing and to increase its service life. The profiles of the rolling elements and raceways are designed for skewing the rolling elements at a predetermined angle to cause the rolling elements to slide relative to the raceways during operation of the bearing. Optimum bearing performance is obtained when the element in the load zone is disposed at a positive skew angle which, by definition, occurs when the rotational axis of the rolling element and the bearing axis are not coplanar and the axial component of an external load applied to a bearing raceway tends to be counteracted by an oppositely directed axial component of a friction force applied to that raceway by the rolling element.

16 Claims, 15 Drawing Figures

LEGEND
$N_I$ = INNER RACEWAY NORMAL CONTACT FORCE.
$N_O$ = OUTER RACEWAY NORMAL CONTACT FORCE.
$R_{rb}$ = RIB REACTION FORCE
UNSKEWED ROLLER (- - - - - -)
SKEWED ROLLER (———)

ROLLER SKEW CONTROL FOR TAPERED ROLLER BEARINGS

The present invention relates to anti-friction bearings, and more particularly, the present invention relates to tapered roller bearings having means for controlling of the skew angle of the tapered rolling elements therein.

Tapered roller bearings comprise an inner member or cone, and an outer member or cup, and a plurality of frusto-conical rolling elements located therebetween thus facilitating relative rotation of the members about a bearing axis normal to the path of relative movement of the members. The inner member has a raceway surface which is tapered at a predetermined angle with respect to the bearing axis, and the outer member has a raceway surface which is tapered to another greater predetermined angle with respect to the bearing axis. Conventionally, these bearings are designed so that, when subjected to the loads they are designed to carry, the taper angles have apexes with a common locus on the bearing axis, and the rotational axis of each rolling element also intersects the bearing axis at the aforementioned locus. By virtue of this structure, pure rolling contact is assumed to exist between the rolling elements and the raceways of the inner and outer members when the bearing operates under load.

In the conventional tapered roller bearing, the rolling elements are contained in the annular space between the members by means of one or more flanges which engage one, or the other, or both of the opposite end faces of the rolling elements. During operation of the bearing, the flange means bears against an end face of the rolling element and, as a consequence, generates friction therebetween. This friction tends to cause each rolling element to skew about an axis which is normal to its own rolling axis and which intersects the bearing axis. When so skewed, each rolling element has an axially-directed component of sliding motion relative to the inner and outer members. In the conventional bearing, the axially directed sliding component and concomitant friction forces are usually codirectional with the axial loads applied to the respective inner and outer members, so that the rolling elements are said to be skewed in a negative angular direction.

It has been determined that when a roller bearing operates with its rolling elements disposed at negative skew angles, the bearing has higher friction and lower life than if it were to operate with the elements disposed at positive skew angles wherein components of the friction forces between the elements and the members acting on the members counteract components of axial loads carried by those members. For instance, in U.S. application, Ser. No. 661,870, filed Feb. 27, 1976, which is a continuation of application, Ser. No. 497,268, filed Aug. 14, 1974, which is a continuation of application Ser. No. 377,124, filed July 6, 1973, for Roller Bearings Comprising Rollers With Positive Skew Angle, there are disclosed various means for effecting skew control for rolling elements in a spherical roller bearing so that the rolling elements do not assume negative skew angles during operation of the bearing. In U.S. application Ser. No. 404,787, filed Oct. 9, 1973, for Cage Control Of Skew Angle In Roller Bearings, there are disclosed various cage structures for cooperating with rolling elements in a roller bearing to effect the desired skew control. The disclosures of the above identified applications are incorporated herein by reference. The present application, on the other hand, is directed to structures for controlling the skew angle of the rolling elements in tapered roller bearings.

With the foregoing in mind, it is a primary object of the present invention to provide a novel tapered roller bearing having a minimum amount of friction and a maximum service life.

It is another object of the present invention to provide an improved tapered roller bearing wherein its tapered rolling elements do not assume negative skew angles during operation of the bearing.

More specifically, each tapered roller bearing of the present invention comprised inner and outer members having raceways confronting one another, a plurality of frusto-conical rollers contained between the raceways to mount the members for rotation relative to one another about a bearing axis, and means for causing the rollers to assume a non-negative or positive skew angle when the bearing is loaded and the members rotate about the bearing axis.

In each bearing, the rolling elements have profiles with apexes offset from the bearing axis when the bearing operates under its designed load, and surface means on the raceways cooperate with the rolling elements to generate the desired skew moments.

In one group of embodiments, the surface means is designed to cause the roller skewing moment developed by the inner raceway to predominate over a corresponding moment developed by the outer raceway so that the desired positive skew angle is attained. In one embodiment of this group, the surface means is provided by surface relief of the inner raceway between the ends of each roller and surface relief of the outer raceway adjacent the ends of each roller. In another embodiment of the group, the inner raceway surface is rougher than the outer raceway surface.

In another group of embodiments, the surface means is designed to cause the roller skewing moment developed by the outer raceway to predominate over the corresponding moment developed by the inner raceway to effect the desired skew angle. In several embodiments of this group, the surface means is provided by surface relief of the outer raceway between the ends of the roller and surface relief of the inner raceway adjacent the ends of the roller. In still another embodiment of this group, the outer raceway surface is rougher than the inner raceway surface.

These and other objects, features and advantages of the present invention should become apparent from the following description when taken in conjunction with the accompanying drawings, in which.

Figure 1:
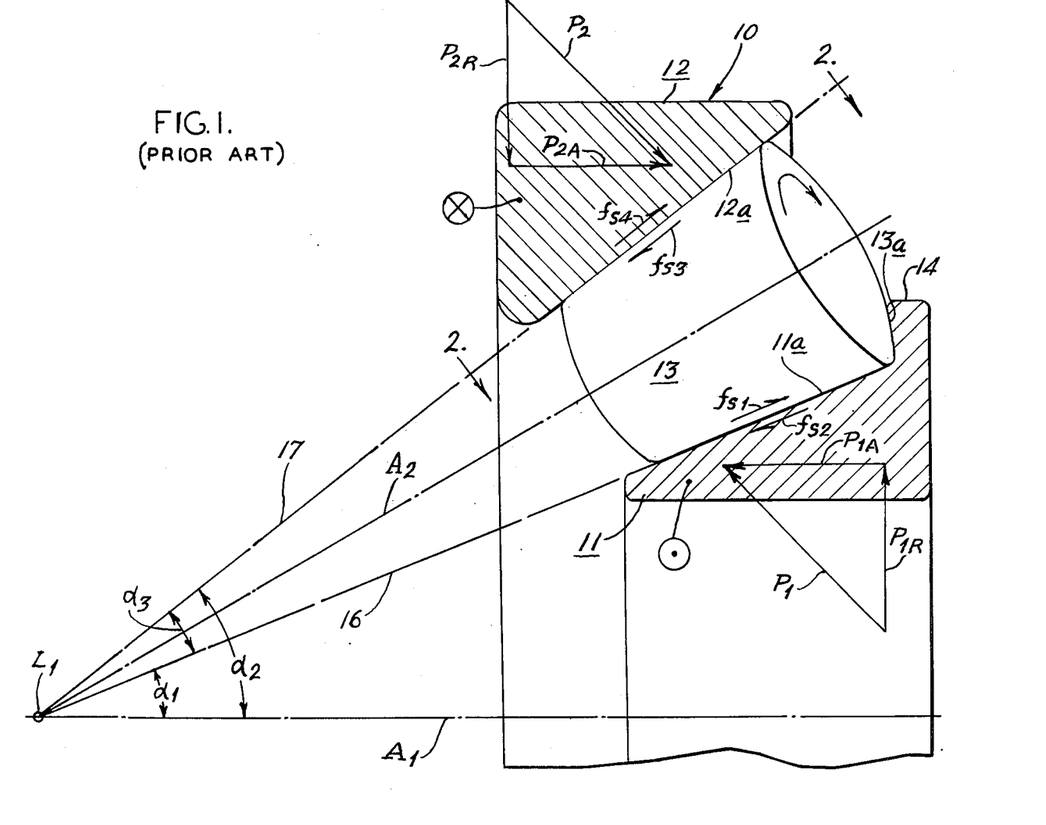
FIG. 1 is an enlarged fragmentary sectional view of a conventional tapered roller bearing with certain forces illustrated vectorially therein.

Referring now to the drawings, FIG. 1 illustrates a conventional tapered roller bearing 10. The bearing 10 comprises an inner member or cone 11 having an inner raceway 11c and an outer member or cup 12 having an outer raceway 12a. The raceways 11a and 12a confront one another to form an annular space therebetween, and a plurality of tapered rolling elements, such as the rolling element or roller 13, are interposed in the annular space to mount the members for relative rotation about a bearing axis $A_1$ which is disposed normal to the paths of relative movement of the bearing members 11 and 12. The inner member 11 has a peripheral flange or rib 14 which extends radially outward to engage the right-hand end face 13a of the rolling element 13.

In the conventional tapered roller bearing, the inner raceway 11a has a tapered or conical surface which is generated by the revolution of a line 16 about the bearing axis $A_1$. The line intersects the bearing axis at an apex or point $L_1$. The outer raceway 12a also has a tapered or conical surface which is similarly generated by a line 17. The line 17 also intersects the bearing axis $A_1$ coincident with line 16 at apex $L_1$. The line 17 generating the outer raceway surface 12a defines an angle $\alpha_2$ with respect to the bearing axis $A_1$, and the lines 16 and 17 subtend an angle $\alpha_3$ with respect to one another.

The conventional tapered roller bearing is designed so that each rolling element, such as the element 13, has an axis of rotation $A_2$ which intersects the bearing axis $A_1$ at the apex $L_1$ when the bearing carries its designed load. By virtue of these geometrical relationships, pure rolling contact is theoretically presumed to exist between the rolling elements and the inner and outer raceways during rotation of the bearing, because the peripheral rolling speeds of the raceways 11a and 12a and the roller 13 are equal along the lines 16 and 17, respectively. In other words, lines 16 and 17 represent lines of equal epicyclic rolling motion, and are also herein referred to as theoretical equal speed lines.

Figure 2:
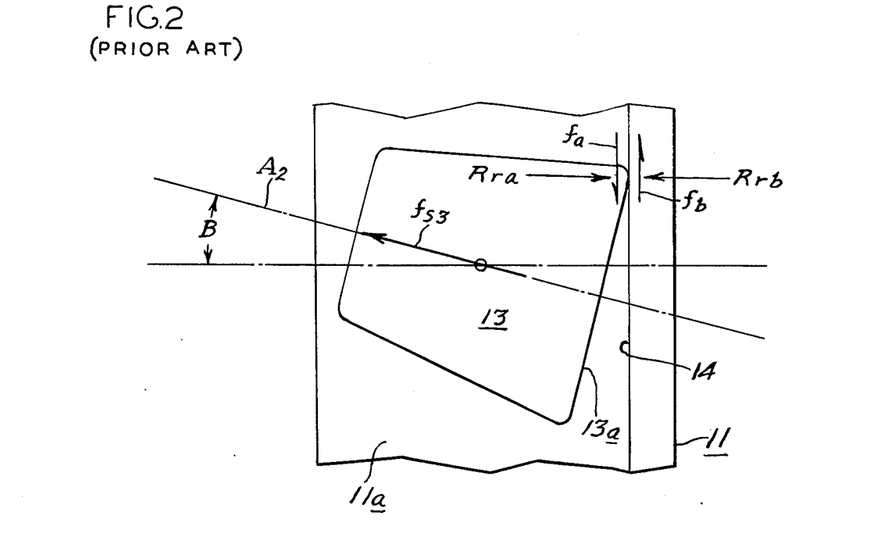
FIG. 2 is a sectional view taken along line 2—2 of FIG. 1.
Figure 9A:
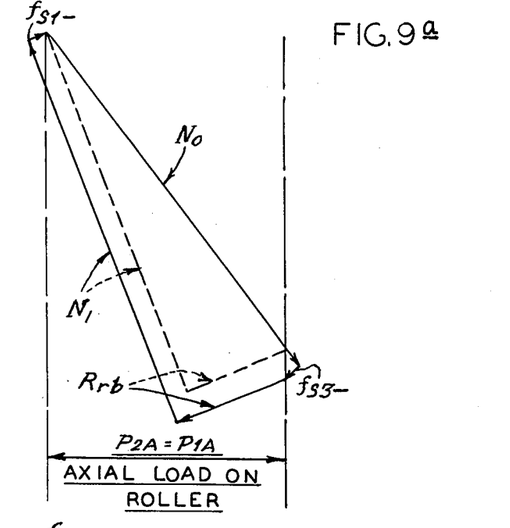
FIGS. 9a-9c are force equilibrium polygons for the rollers in the bearings illustrated in FIGS. 1-2, 3-4, and 5-6, respectively.

During operation of the conventional bearing 10, an external load $P_1$ applied to the inner member 11 causes a normal contact load $N_1$ to act on the roller, which, in turn, causes a normal reaction load $N_2$ to be applied to the outer member 12. These reaction loads are not equal and opposite and thus, a third force $Rr_b$ from the flange 14, is needed to achieve roller force equilibrium. The external loads $P_1$ and $P_2$ have axial and radial components $P_{1A}$, $P_{1R}$, and $P_{2A}$, $P_{2R}$, respectively. As the rolling element 13 rotates, the flange 14 engages its right-hand axial end face 13a, and such engagement creates friction forces $f_a$ and $f_b$ between the inner member 11 and the rolling element 13. As the members rotate, these friction forces generate a moment which tends to skew the rolling element 13 to some angle $\beta$ (FIG. 2) which is the angle between the rotational axis $A_2$ of the element 13 and a plane in which the bearing axis $A_1$ lies. This particular situation is undesirable because the skewing causes each rolling element to slide axially relative to the raceways. The sliding generates friction forces $f_{s1}$-$f_{s4}$ between the raceways and the rolling elements, and when the friction forces $f_{s2}$ and $f_{s4}$ on the raceways extend in the same direction as the axial load components $P_{1A}$ and $P_{2A}$ on the members 11 and 12, respectively, the rolling element is said to be skewed at a negative angle. A typical negative skew angle B is illustrated in FIG. 2, and as illustrated in FIG. 1, the friction forces $f_{s2}$ and $f_{s4}$ extend in the same general directions as the axial components $P_{1A}$ and $P_{2A}$ on the inner and outer members 11 and 12, respectively, When a bearing operates with the rolling elements desposed at a negative skew angle, as will be discussed hereinafter with reference to FIG. 9a, the bearing has a higher friction and lower service life than a bearing which operates with the rolling elements disposed at a positive skew angle.

In accordance with the present invention, a tapered roller bearing 110 (FIG. 3) which operates with minimum friction and with a maximum service life is provided. To this end, the bearing 110 is designed so that each rolling element assumes a non-negative or positive skew angle in the load zone during operation of the bearing under its designed load. This is effected by introducing a small and controlled amount of sliding friction at predetermined locations between the raceways and the rollers for causing the slip friction resulting from roller skew to couteract the axial components $P_{1A}$ and $P_{2A}$ of external load $P_1$ and $P_2$ applied to the inner and outer bearing members 111 and 112, respectively, When this condition occurs, the roller is skewed at a positive skew angle, and when so skewed, the bearing operates with lower friction and has a longer service life than a similar bearing wherein the roller is negatively skewed.

Figure 3:
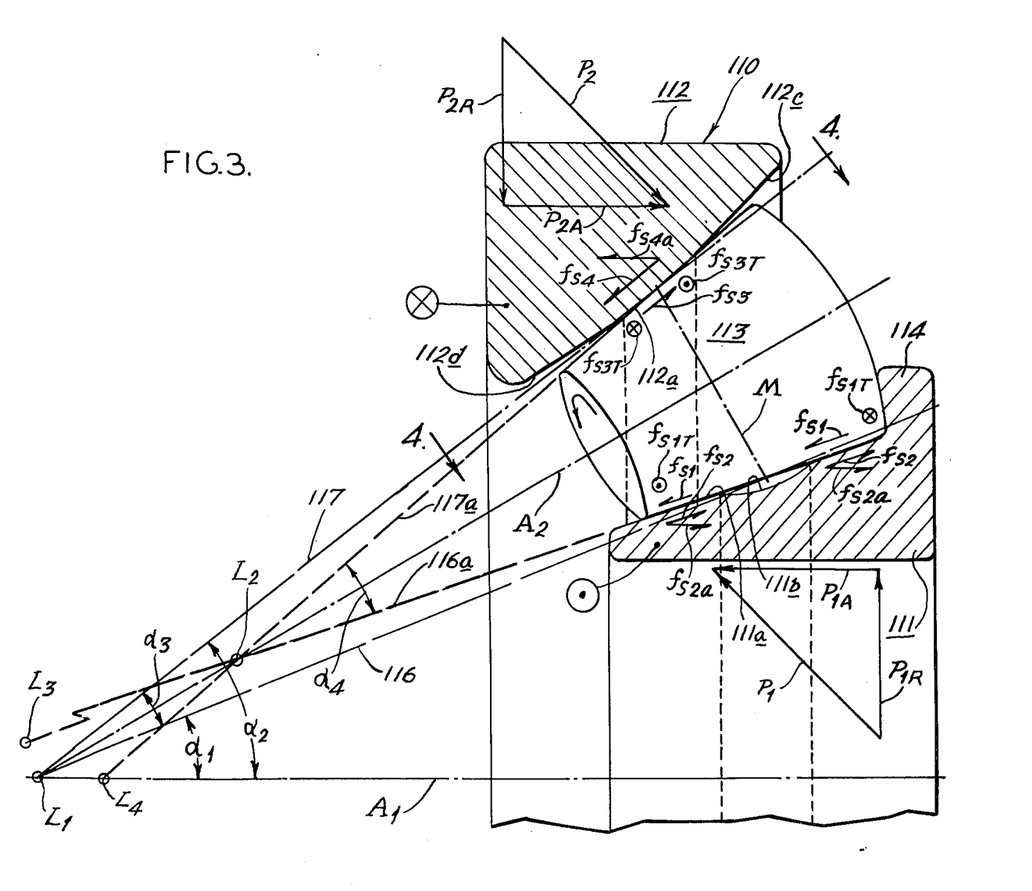
FIG. 3 is an enlarged fragmentary sectional view of a tapered roller bearing embodying the present invention with certain forces illustrated vectorially therein.

As best seen in FIG. 3, the bearing 110 is designed so that theoretical lines of equal peripheral speed, indicated as 116 and 117, pass axially between the rolling element 113 and the inner and outer bearing members 111 and 112, at diametric locations and intersect the bearing axis $A_1$ at an apex or point $L_1$. The inner and outer raceways 111a and 112a, respectively, and each tapered rolling element 113 are designed so that their generatrices intersect at an apex or point $L_2$. The apex $L_2$, in this embodiment, is located on the rolling element axis $A_2$ between the apex $L_1$ and the rolling element 113 itself. In other words, the apex $L_2$ of the lines of profile generation 116a and 117a is situated inside the zone defined between the lines of pure rolling 116 and 117. In this embodiment, the roller profile apex $L_2$ is situated a predetermined distance radially outward of the bearing axis $A_1$ intermediate the apex $L_1$ and the path of movement of the rolling elements 113 between the inner and outer members 111 and 112. Also, the lines of generation 116a and 117a of the profile of the rolling element 113 intersect the theoretical lines of constant speed 116 and 117 at the longitudinal median M of the rolling element 113, and the lines 116a and 117a subtend an angle $\alpha_4$ which is greater than the angle $\alpha_3$, between the theoretical equal speed lines 116 and 117. A projection of the line 117a intersects the bearing axis at point $L_4$, and a projection of the line 116a intersects the bearing axis at a point $L_3$ which would actually be located off the sheet.

As noted above, the theoretical equal speed lines 116 and 117 represent lines along which pure rolling contact would exist between the inner and outer members 111 and 112 and the rolling element 113 if they were designed so as to contact one another along those lines. However, since the raceway surfaces 111a and 112a and the profile of the rolling element 113 are designed so that the profile apex $L_2$ is spaced radially outward of the bearing axis $A_1$, the surface of the rolling element 113 is subjected to differing contacting surface velocities at spaced locations with respect to the inner and outer members. For instance, assuming that pure rolling contact were to exist between the rolling element 113 and the inner and outer members at the median M of the element 113, there would be a tendency for the rolling element 113 to be accelerated to the left of the median M and retarded to the right of the median M during operation of the bearing. The accelerating and retarding action is due to the fact that the roller 113 rotates at one predetermined angular velocity about its axis. At the point of rolling contact, i.e., at the roller median M, the tangential velocity of the roller 113 equals the peripheral velocity of the inner raceway 111a. However, because the inner raceway 111a and roller profile are designed so that they contact one another above the line of pure rolling 116 to the left of the median M, the inner raceway 111a tends to accelerate the roller 113 at that location. For similar reasons, the opposite effect occurs to the right of the median M to cause the retarding action on the roller 113.

The accelerating and retarding action on the roller 113 on opposite sides of its median M creates a moment on the roller 113 about the median M to skew the roller 113 counterclockwise. The engagement of the roller 113 with the outer raceway 112a, however, has an effect on the roller 113 which is opposite the effect produced by the inner raceway 111a on the roller 113. That is, between the outer raceway 112a and the roller 113, the zones of acceleration and deceleration are reversed, with the zone of acceleration being located to the right of the median M and the zone of deceleration being located to the left of the median M.

Figure 4:
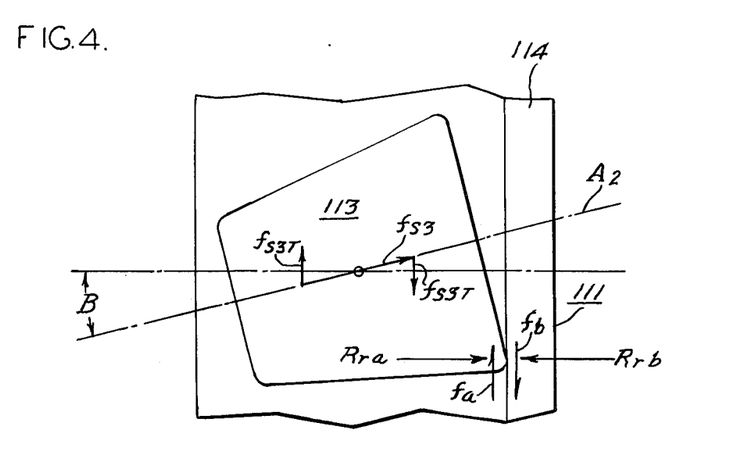
FIG. 4 is a sectional view taken along line 4—4 of FIG. 3.

To cause the roller 113 to assume a positive skew angle, the inner member skew moment is made to predominate over the outer skew moment. This is ensured by providing the inner raceway 111a with a very shallow central peripheral groove or relief 111b located underneath the roller 113 adjacent its median M so that the roller 113 engages the inner raceway on opposite sides of the relief 111b with greater contact pressure than adjacent its median M. As an example, the relief is preferably of a depth equal to about one-half the elastic deformation of the contact, or in the region of about 0.00025 times the mean roller diameter. The outer raceway 112a, on the other hand, is provided with a pair of relieved surfaces 112c and 112d spaced outwardly of the median M so that the roller 113 engages the outer raceway 112 adjacent its median M while being spaced from (or engaging with a lower contact pressure) the raceway 112 adjacent its ends. By virtue of this structure, the magnitude of the inner moment is made greater than the oppositely directed outer moment to skew the roller 113 as illustrated in FIG. 4. It is noted that the reliefs 111b, 112c and 112d are greatly exaggerated for purposes of illustration.

In order to demonstrate how the present invention affects positioning of the rollers at positive skew angles during operation of the bearing under load, and with particular reference to FIGS. 3 and 4, the reader should view the roller 113 as stationary and the inner and outer members 111 and 112 rotating relative to one another in opposite directions in the manner shown with the inner member moving toward the reader and the outer member moving away from the reader. Under these conditions, the speed of the inner raceway surface 111a at the small (left) end of the roller 113 is higher than that of the roller surface 113 at that location. Consequently, the tangential component $f_{s1t}$ of the friction force $f_{s1}$ on the roller 113 has the same direction as the direction of movement of the inner ring; that is, toward the reader. At the large end of the roller, the tangential component $f_{s1t}$ of the friction force is oppositely directed, since the peripheral speed of the roller 113 at that location is greater than the peripheral speed of the inner raceway 111a at the same location. This results in a force couple or moment from the inner ring 111 on the roller 113 which tends to skew the roller 113 in the direction shown.

At the outer ring 112 there is a skewing moment in the opposite direction. This is because the speed of the outer raceway 112a adjacent the small end of the roller 113 is higher than the speed of the surface of the roller 113 at that point. Consequently, the tangential component $f_{s3t}$ of the friction force $f_{s3}$ on the roller 113 has the same direction as the direction of movement of the outer ring; that is, away from the viewer. At the large end of the roller 113, the tangential component $f_{s3t}$ of the friction force $f_{s3}$ is oppositely directed, since the roller surface speed is greater than the peripheral speed of the outer raceway 112. The skewing moment of the outer ring 112 on the roller 113, is however, smaller than the inner ring 111 because the distance between the friction force components $f_{s3t},f_{s3t}$ as a consequence of the particular geometry of the raceway profiles. The net result is that the inner ring moment dominates and skews the roller in the desired direction illustrated.

When the roller 113 is skewed in the direction illustrated in FIG. 4, the surface thereof engaged with the lower raceway 111a must slide axially rightward relative to the raceway 111a in order for the roller 113 to travel in the annular space between the members. The roller 113 must slide axially in the opposite direction with respect to the outer raceway 112a. Because of the sliding, leftward friction forces $f_{s1},f_{s1}$ develop on the underside of the roller 113, and rightward reaction friction forces $f_{s2},f_{s2}$ develop on the inner raceway 111. The friction forces $f_{s2},f_{s2}$ have axial components $f_{s2a},f_{s2a}$ which act axially rightward on the inner member 111 to counteract the leftward axial component $P_{1A}$ of the external load $P_1$. In the same way, the rightward axial load component $P_{2A}$ of the external load $P_2$ is counteracted at the outer member 112 by the leftward axial component $f_{s4a}$ of the friction force $f_{s4}$. Thus, when the rolling axis $A_2$ of the roller 113 is not coplanar with the bearing axis $A_1$, and these force conditions occur, the roller 113 is defined as being disposed at a positive skew angle and the aforementioned desirable consequences occur.

Figure 5:
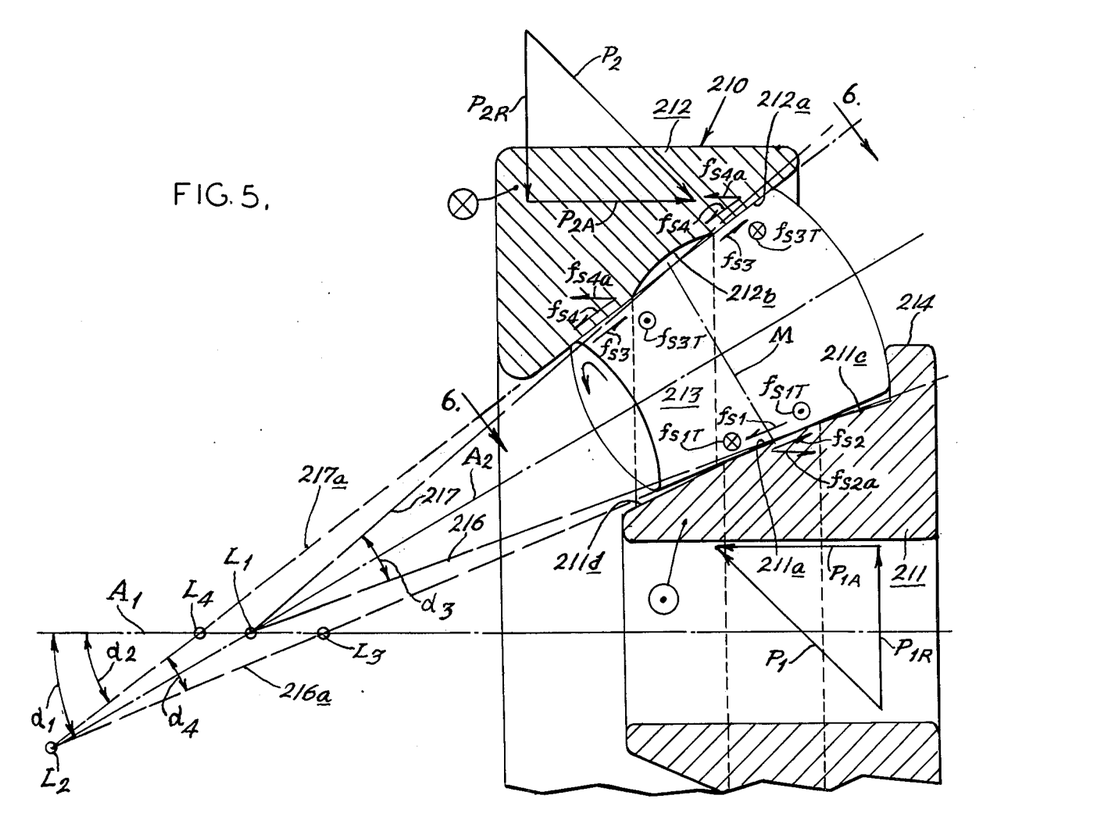
FIG. 5 is a view similar to FIG. 3 but illustrating a modified embodiment of the present invention.

Because of the tapered shape of the rolling element, the right-hand end faces of the rolling elements always engage the flange or rib 114 with a force $R_{ra}$ which creates a reaction force $R_{rb}$, and friction forces $f_a,f_b$ are developed therebetween. However, the magnitude of the friction forces are significantly reduced, because some of the flange-rolling element contact load is carried by the friction forces between the raceways and the rolling elements due to the positive skew. This may be best understood by reference to FIGS. 9a and 9b, wherein the various forces acting in bearings operating with rollers under positive, negative and zero skew conditions are illustrated schematically. For ease of presentation, an equilibrium force polygon is drawn for each rolling element illustrating forces which would exist when the bearing configurations depicted in FIGS. 1, 3 and 5 are subjected to an axial load of $P_{1A}$ per roller. The broken line triangles in each figure represent the force polygons when the rollers are unskewed. The solid line polygons in each figure represent the force polygons when the rollers are skewed, either positively or negatively. The relative magnitudes of the rib reaction forces $R_{rb}$ in each figure should be noted.

In the case of the prior art bearing design (FIG. 1), it has been established that the bearing normally operates with each rolling element disposed at a negative skew angle. The effect of the resulting lateral friction or skid forces, $f_{S1}$ and $f_{S3}$ on the force equilibrium is shown in the uppermost figure, FIG. 9a, wherein these friction forces cause both the normal forces $N_O$ and $N_1$ and the rib force $R_{rb}$ to be greater with a negatively-skewed roller than with an unskewed roller. Thus, a bearing operating in such a negatively-skewed mode has higher friction losses and poorer fatigue life than predicted on a basis of force magnitudes when skew is ignored. Note in particular that the rib force $R_{rb}$ is increased, thus causing an increase in the roller skewing moment.

Figure 9B:
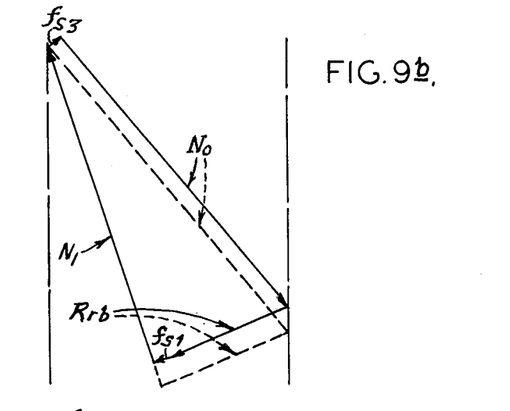

In a bearing designed according to the embodiment illustrated in FIG. 3, the roller has a positive skew, and the resulting force polygon is illustrated in FIG. 9b. It will be noted that the normal forces $N_0$ and $N_1$ and the rib reaction force $R_{rb}$ are all less than they would be if the roller were unskewed. Note, however, that the degree of apex displacement illustrated in FIG. 3 has been greatly exaggerated for ease of illustration. Thus the corresponding polygon in FIG. 9b appears much broader based than the one in FIG. 9a. However, the relative difference in magnitudes of the rib reaction force $R_{rb}$ is thus also exaggerated. However, the tendency, in this embodiment, is to cause a slight increase in the magnitude of the rib force $R_{rb}$ in the process of securing frictional skew moments with which to overcome the friction moment associated with the rib force.

By way of example, a bearing constructed in accordance with FIGS. 3 and 4 would have an apex $L_2$ spaced radially outward of the bearing axis $A_1$ a distance of about 0.005 times the mean diameter of the inner raceway. It is noted, however, that because of the skew angle of the rolling element 113, the apex $L_2$ is located forwardly of the plane of the section of FIG. 3.

Figure 6:
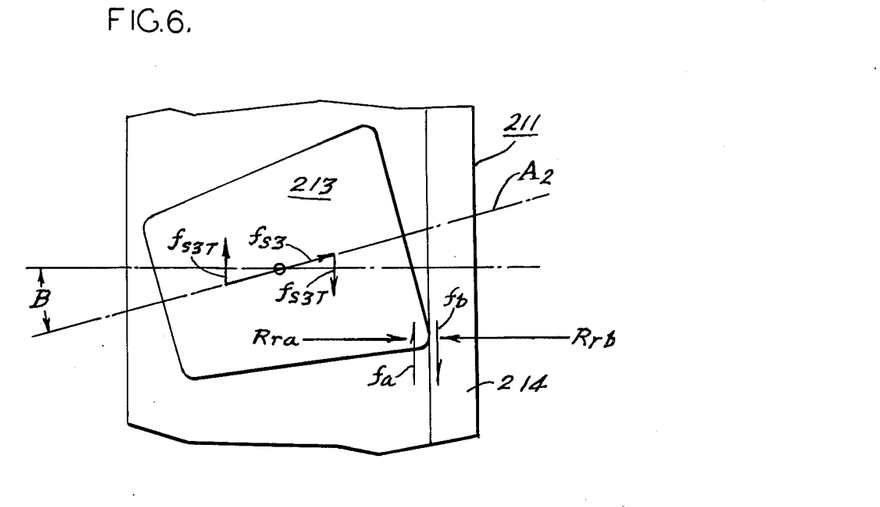
FIG. 6 is a sectional view taken along line 6—6 of FIG. 5.

A modified embodiment of the present invention is illustrated in FIGS. 5 and 6. The tapered roller bearing 210 illustrated therein comprises an inner member 211, an outer member 212, and a series of rolling elements, such as the roller 213, mounted between the inner and outer members. The bearing 210 has a bearing axis $A_1$ which is disposed normal to the path of relative movement of the rolling elements 213 between the inner and outer members, and the rolling element 213 has a rotational axis $A_2$. In this embodiment, as contrasted with the aforementioned embodiment, the outer raceway 212a is generated by a line 217a which has an apex situated on the bearing axis $A_1$ and forming an angle $\alpha_2$ with respect to that axis such that a projection of line 217a intersects the element axis at $L_2$. The inner raceway 211a is generated by a line 216a which also intersects the line 217a at $L_2$, the line 216a forming an angle $\alpha_1$ with respect to the bearing axis and the lines 216a and 217a subtending an angle $\alpha_4$ with respect to one another. The apex $L_2$ is spaced radially of the bearing axis $A_1$ a predetermined distance and rearward of the plane of the section, as compared with the aforementioned embodiment wherein the apex $L_2$ is spaced radially outward of the bearing axis $A_1$ and forward of the plane of the section. It is noted that in this embodiment, the line 216a intersects the bearing axis at $L_3$; the line 217a intersects the bearing axis at $L_4$; and the angle $\alpha_3$ subtended by the lines 216 and 217 (corresponding to the lines 116 and 117 in the previous embodiment) is greater than the angle $\alpha_4$.

The theoretical lines of constant speed 216 and 217, which have their apex $L_1$ on the bearing axis $A_1$, intersect the lines of generation 216a and 217a at the roller median M; however, because the apex $L_2$ is located beyond the bearing axis $A_1$, the locations of relative sliding motion between the roller 213 and the raceways 211a and 212a are the reverse of the locations in the embodiment of FIGS. 3 and 4. For instance, between the inner raceway 211a and the bottom of the roller 213, the zone of roller acceleration is located to the right of the roller median M and the zone of deceleration is located to the left thereof. As a result, the skew moments from the outer and inner raceways change sign.

In this embodiment, to obtain positive skew, it is important for the skew moment provided by the outer member 212 to predominate over the inner member 211. To this end, the outer raceway 212a is provided with a central peripheral relief or shallow groove 212b, and the inner raceway 211 is provided with relieved surfaces 211c and 211d, which are located on opposite sides of the roller median M. Thus, the roller 213 contacts the inner raceway 211a adjacent the roller median M with higher contact pressure than it contacts the outer raceway 212a. The roller 213 engages the outer raceway 212a on opposite sides of the relief 212b with greater contact pressure than adjacent its median M. By virtue of this structure, the axial components $P_{1A}$ and $P_{2A}$ of the external loads $P_1$ and $P_2$ on the inner and outer members respectively, are counteracted by axial components $f_{S2a}f_{S2a}$ of friction forces $f_{S2a}$ and $f_{S4a}$ between the roller 213 and the raceways 211a and 212a in much the same manner as described in the embodiment of FIGS. 3 and 4. It is noted that the reliefs 211c, 211d and 212b are greatly exaggerated for purposes of illustration.

Figure 9C:
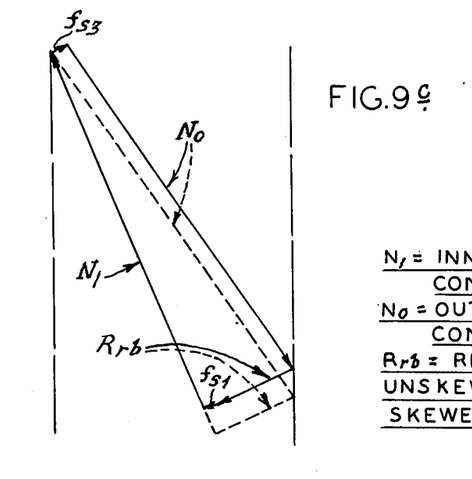

The advantages of the bearing design may be best understood by reference to the force polygon, FIG. 9c. As seen therein, the geometrical relations in this embodiment result in a polygon having a narrower base, indicating a reduction in the rib reaction force $R_{rb}$. Also, there is a reduction in the normal contact forces $N_O$ and $N_I$. The extent of geometrical modifications needed for roller skew control is minimized with this design, since the reduction in the rib reaction force $R_{rb}$ reduces the need for corrective skew moments to be applied to the roller.

Figure 7:
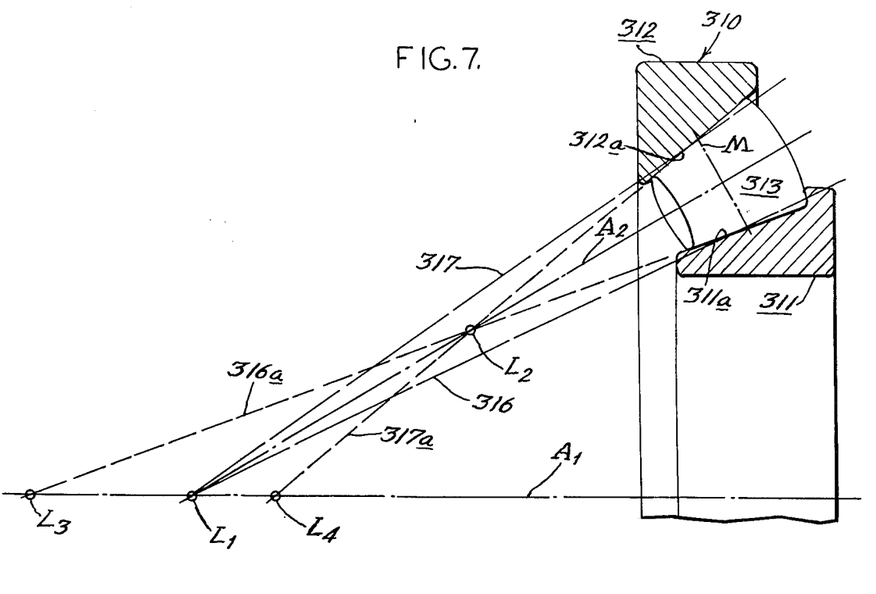
FIGS. 7 and 8 are views similar to FIGS. 3 and 5 but illustrating a modified embodiment wherein differential raceway roughness is utilized to effect the desired roller skewing.

FIGS. 7 and 8 illustrate modified embodiments of the present invention. These embodiments have certain geometric relations which are similar to those of the embodiments of FIGS. 3 and 5, respectively. In the FIG. 7 embodiment, the bearing 310 has an inner member 311, an outer member 312, and a roller 313. The apex $L_2$ of the frusto-conical roller 313 is located off the bearing axis $A_1$ in a direction toward the roller. The apexes $L_3$ and $L_4$ of lines 316a and 317a defining raceways 311a and 312a, respectively, are located at appropriately differing points on the bearing axis $A_1$ so that geometrical line contact is maintained between the raceways and the roller. In this instance, the apex $L_4$ of the outer raceway surface 312a is located closer to the bearing than the apex $L_3$ of the inner raceway surface 311a. The desired roller skew is obtained by making the inner raceway surface 311a rougher than the outer raceway surface 312a. Note that the apex $L_2$ is located inside the zone defined by the lines of equal speed 316 and 317.

Figure 8:
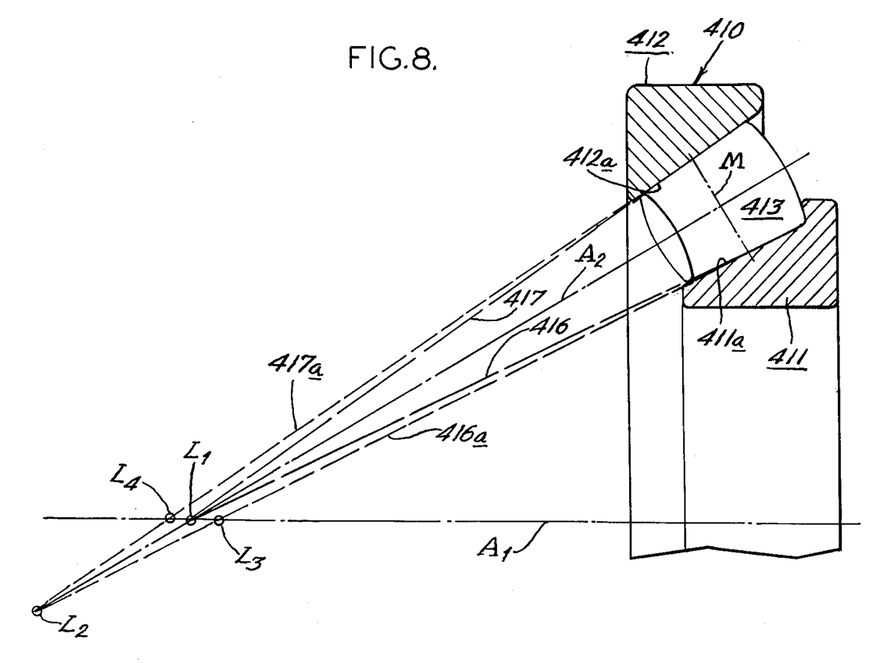

In the FIG. 8 embodiment, the bearing 410 having an inner member 411 and an outer member 412 is designed with the apex $L_2$ of the frusto-conical roller 413 located off the bearing axis $A_1$ a predetermined distance in a direction away from the roller 413. The apexes $L_3$ and $L_4$ of lines 416a and 417a the two raceways 411a and 412a, respectively are located at two spaced points on the bearing axis so that geometrical line contact is maintained between the raceways and the roller. In this embodiment, the apex $L_4$ of the outer raceway surface 412a is located further from the bearing that the apex $L_3$ of the inner raceway surface 411a. The desired roller skew is obtained by making the outer raceway 412a rougher that the inner raceway 411a. Note that the apex $L_2$ is located outside the zone defined by the lines of equal speed 416 and 417.

Figure 10:
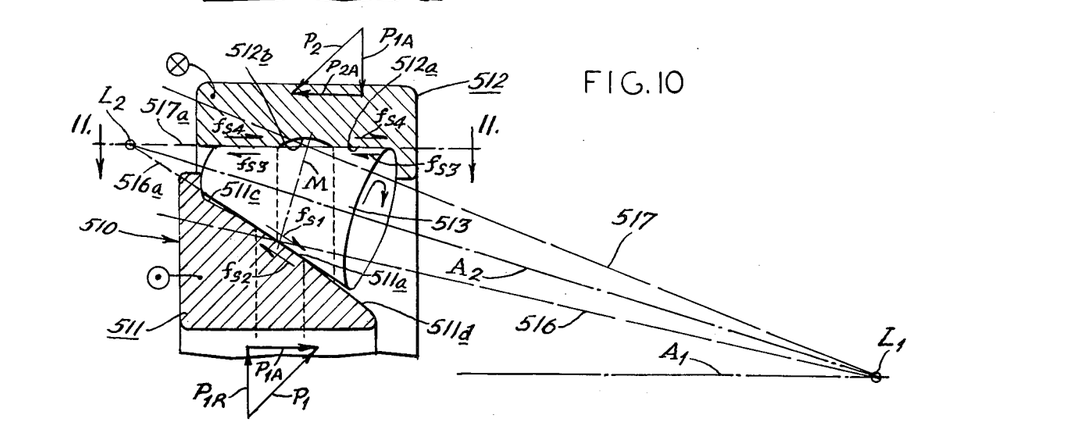
FIGS. 10 and 11 illustrate another modified embodiment wherein only the inner raceway is tapered.
Figure 11:
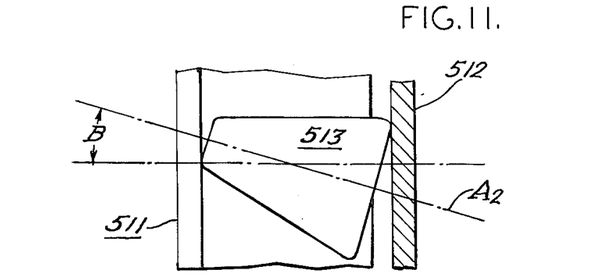
Figure 12:
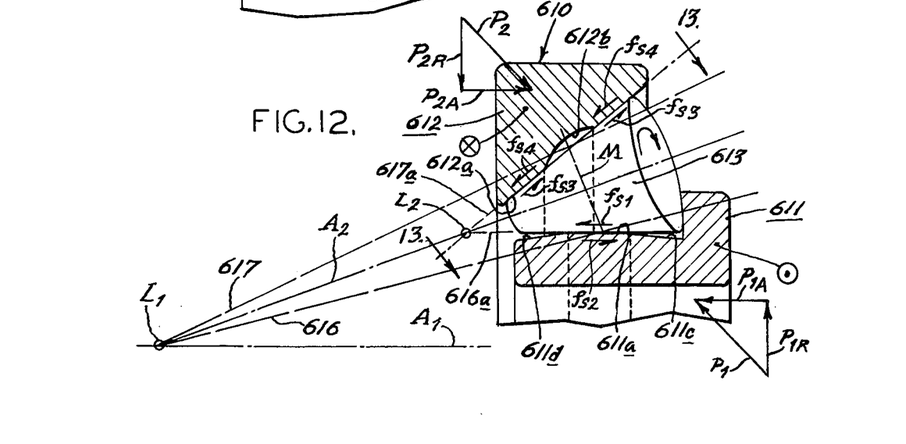
FIGS. 12 and 13 illustrate yet another modified embodiment wherein only the outer raceway is tapered.
Figure 13:
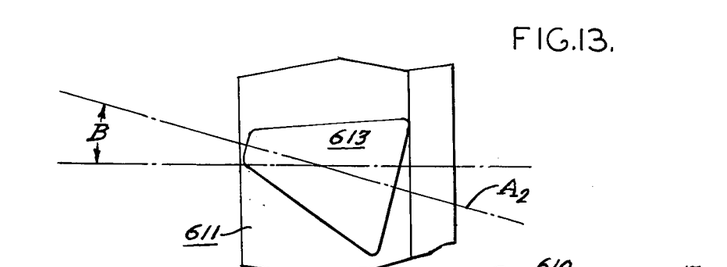

Other modified embodiments of the present invention are illustrated in FIGS. 10-13. In these embodiments, one raceway is cylindrical and the other is tapered. For instance, in the embodiment of FIGS. 10 and 11, the outer raceway is cylindrical and the inner raceway is tapered. In the embodiment of FIGS. 12 and 13, the outer raceway is tapered and the inner raceway is cylindrical.

Referring now to the embodiment illustrated in FIGS. 10 and 11, the desired roller skew is effected by causing the roller skewing moment produced by the outer raceway to predominate over the roller skewing moment produced by the inner raceway. In this bearing 510, the lines of equal peripheral speed 516 and 517 drawn through the roller median M intersect the bearing axis $A_1$ at the apex $L_1$, at which location the rotational axis $A_2$ of the rolling element 513 also intersects the bearing axis $A_1$. The lines of generation 516a and 517a of the inner and outer raceways 511a and 512a, respectively, intersect one another and the rolling element axis $A_2$ at another location $L_2$ which is inside the zone defined by the equal speed lines 516 and 517 when the bearing is under load. In this embodiment, it is noted that the path of relative motion of the inner and outer members 511 and 512 is between the apexes $L_1$ and $L_2$.

During operation of the bearing under load the portion of the roller 513 to the left of the median M at the inner raceway 511a is accelerated by the inner raceway 511a. With the inner and outer members 511 and 512 moving in the directions indicated, the portion of the roller 513 to the right of the median M is retarded by the inner raceway 511a. This acceleration and retarding action produces a moment tending to skew the roller 513 counterclockwise looking downward in FIG. 11. The zones of acceleration and retardation of the roller 513 are reversed with respect to the outer raceway 512a, and the resulting moment generated by the outer raceway tends to skew the roller 513 clockwise. In this embodiment, however, the moment produced by the outer raceway 512a dominates over the moment produced by the inner raceway 511a because of the shallow central groove or relief 512b provided in the outer raceway 512a adjacent the roller median M and the pair of reliefs 511c and 511d in the inner raceway outboard of the median M adjacent the ends of the roller 513. As in the previous embodiments, these reliefs are greatly exaggerated for purposes of illustration only. The inner raceway 511a engages the roller with a greater pressure adjacent the roller median M that the outer raceway at the same location, and the outer raceway engages the roller outboard of the median with a greater pressure than the inner raceway at the same location. As a result, the roller 513 assumes the skew angle B (FIG. 11). When so skewed, friction forces $f_{s3}$ and $f_{s4}$ develop on the roller 513 and outer raceway 512a, and friction forces $f_{s1}$ and $f_{s2}$ develop on the roller 513 and inner raceway 511a, respectively. When the axial components of the friction forces $f_{s2}$ and $f_{s4}$ on the inner and outer raceways 511a and 512a, respectively, are directed as indicated in FIG. 10, i.e., in directions counter to the directions of the axial load components $P_{2A}$ and $P_{1A}$ of external load $P_2$ and $P_1$, and the roller axis $A_2$ is not coplanar with the bearing axis $A_1$, the roller 513 is positively skewed. As noted heretofore, when the roller is skewed positively, the bearing 510 operates with lower overall friction and a longer service life than does a similarly loaded bearing with a negatively skewed roller.

In the bearing 610 illustrated in FIGS. 12 and 13, the desired roller skew is achieved by causing the roller skewing moment produced by the outer raceway to predominate over the roller skewing moment produced by the inner raceway. In this embodiment, the equal speed lines 616 and 617 intersect the bearing axis $A_1$ at an apex $L_1$. The lines of generation 616a and 617a of the inner and outer raceways 611a and 612a, respectively, intersect one another at point $L_2$ when the bearing is under load. The point $L_2$ is located inside the zone defined between the equal speed lines 616 and 617 and is located on the rotational axis $A_2$ of the roller 613. In this embodiment, the point $L_2$ is located between the point $L_1$ and the inner and outer members 611 and 612, as contrasted with the embodiment of FIGS. 10 and 11 wherein the points $L_1$ and $L_2$ are located on opposite sides of the bearing 510. Also, it is noted that the inner raceway 611a is provided with surface reliefs 611c and 611d outboard of the roller median M, and the outer raceway 612a is provided with a shallow relief or groove 612b adjacent the roller median M. These raceway surface reliefs, which are greatly exaggerated for purposes of illustration, cooperate with the roller 613 to cause it to skew positively into the angle B indicated in FIG. 13 when the inner and outer bearing members 611 and 612 rotate relative to one another in the directions indicated in FIG. 12 and the bearing is under load. As in the other embodiments, the friction forces $f_{s2}$, and $f_{s4}$ function to counteract axial components $P_{1A}$ and $P_{2A}$ of the external loads $P_1$ and $P_2$, respectively to provide the advantages of positive skew.

In view of the foregoing, it should be apparent that novel tapered roller bearings which operate with rollers at positive skew angles have been provided. The bearings have a minimum of friction and hence a maximum service life.

While preferred embodiments of the present invention have been described in detail, various modifications, alterations and changes may be made without departing from the spirit and scope of the present invention as defined in the appended claims.

What is claimed is:

1. A bearing comprising inner and outer members having inner and outer raceways confronting one another to define an annular space, at least one rolling element rotatable about an axis in said annular space adapted to engage said members at inner and outer raceway contact zones and mounting said members for rotation relative to one another in a path about a bearing axis, said rolling element having a profile tapered at a predetermined angle with respect to its rotational axis, the apex of the taper angle of the rolling element being spaced from said bearing axis when the bearing is under a predetermined external load and surface means on at least one of said raceways to cause said rolling element at a predetermined position in the load zone to assume a non-negative skew angle within a predetermined angular range, said rolling element having a skew angle when the rolling element axis and bearing axis are not coplanar and said skew angle being positive when the axial friction force component on a raceway arising between said rolling element and said raceway in said contact zone is so directed that it counteracts the axial component of the external load on said one raceway.

2. A bearing according to claim 1 wherein a pair of construction lines originate at the intersection of the rolling element axis and bearing axis extend axially toward the bearing intersecting points of pure rolling between said rolling element and raceways thereby defining an ever widening zone between them, said rolling element apex being situated in said zone.

3. A bearing according to claim 2 wherein the surface of said inner raceway has a higher coefficient of friction than the surface of said outer raceway to provide said surface means.

4. A bearing according to claim 2 wherein said surface means includes an annular relief in said inner raceway intermediate the ends of said rolling element so that said element engages the inner raceway with higher contact pressure on opposite side of the relief.

5. A bearing according to claim 2 wherein said outer raceway has a pair of reliefs outboard of the median of said rolling element so that the rolling element engages the outer raceway with higher contact pressure inboard of the reliefs.

6. A bearing according to claim 1 wherein a pair of construction lines originate at the intersection of the rolling element axis and bearing axis extend axially toward the bearing intersecting points of pure rolling between said rolling element and raceways thereby defining an ever widening zone between them, said rolling element apex being situated outside said zone.

7. A bearing according to claim 6 wherein the surface of said outer raceway has a higher coefficient of friction than the surface of said inner raceway to provide said surface means.

8. A bearing according to claim 6 wherein said surface means includes an annular relief in said outer raceway intermediate the ends of said element so that said element engages the outer raceway with higher contact pressures on opposite sides of the relief.

9. A bearing according to claim 6 wherein said inner raceway has a pair of reliefs outboard of the median of the rolling element so that said rolling element engages the inner raceway with a higher pressure inboard of said reliefs.

10. A bearing according to claim 1 wherein said rolling element apex is spaced radially of the bearing axis a distance of at least about 0.005 times the means diameter of the inner raceway.

11. A bearing according to claim 1 wherein one of said raceways is tapered and the other is cylindrical.

12. A bearing according to claim 11 wherein said outer raceway has relief intermediate the ends of the rolling element and said inner raceway has a pair of reliefs outboard of the median of said rolling element.

13. A bearing according to claim 12 wherein a pair of construction lines originate at the intersection of the rolling element axis and bearing axis extend axially toward the bearing intersecting points of pure rolling between said rolling element and raceways thereby defining an ever widening zone between them, said rolling element apex being situated inside said zone.

14. A bearing according to claim 11 wherein said one raceway is said inner raceway and said other raceway is said outer raceway, and said path of movement of said bearing members is located intermediate said rolling element apex and the intersection of the rolling element axis and bearing axis.

15. A bearing according to claim 11 wherein said one raceway is said outer raceway and said other raceway is said inner raceway, and said rolling element apex and the intersection of the rolling element axis and bearing axis are located to one said of said path of movement of said bearing members.

16. A bearing according to claim 11 wherein the surface of said outer raceway has a higher coefficient of friction than the surface of said inner raceway.

* * * * *

UNITED STATES PATENT AND TRADEMARK OFFICE
CERTIFICATE OF CORRECTION

PATENT NO. : 4,065,191
DATED : December 27, 1977
INVENTOR(S) : Erik Magnus Kellstrom It is certified that error appears in the above-identified patent and that said Letters Patent are hereby corrected as shown below:

Column 3, line 13; "11c" should read "11a"

Column 4, line 25; "couteract" should read "counteract"

Column 6, line 28; after "$f_{s3t}, f_{s3t}$" insert "is smaller than the distance between the force components $f_{s1t}, f_{s1t}$"

Signed and Sealed this

Seventeenth Day of October 1978

[SEAL]

Attest:

RUTH C. MASON
*Attesting Officer*

DONALD W. BANNER
*Commissioner of Patents and Trademarks*